United States Patent
Hu

(10) Patent No.: US 12,519,552 B2
(45) Date of Patent: Jan. 6, 2026

(54) MEASUREMENT METHOD FOR UE, TERMINAL DEVICE AND NETWORK DEVICE

(71) Applicant: GUANGDONG OPPO MOBILE TELECOMMUNICATIONS CORP., LTD., Dongguan (CN)

(72) Inventor: Rongyi Hu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 445 days.

(21) Appl. No.: 18/072,668

(22) Filed: Nov. 30, 2022

(65) Prior Publication Data
US 2023/0088518 A1 Mar. 23, 2023

Related U.S. Application Data

(63) Continuation of application No. PCT/CN2020/093820, filed on Jun. 1, 2020.

(51) Int. Cl.
H04W 24/10 (2009.01)
H04B 17/30 (2015.01)

(52) U.S. Cl.
CPC ............ *H04W 24/10* (2013.01); *H04B 17/30* (2015.01)

(58) Field of Classification Search
CPC ................................. H04W 24/10; H04B 17/30
See application file for complete search history.

(56) References Cited

U.S. PATENT DOCUMENTS

| 2019/0223216 | A1 | 7/2019 | Siomina |
| 2019/0364452 | A1 | 11/2019 | Hwang et al. |
| 2020/0296612 | A1 | 9/2020 | Ma et al. |
| 2022/0052828 | A1* | 2/2022 | Yiu ............... H04L 5/0098 |

FOREIGN PATENT DOCUMENTS

| CN | 103188708 A | 7/2013 |
| CN | 109391341 A | 2/2019 |
| CN | 109511124 A | 3/2019 |
| CN | 109587711 A | 4/2019 |
| CN | 109788497 A | 5/2019 |
| CN | 110062413 A | 7/2019 |
| CN | 110972155 A | 4/2020 |

OTHER PUBLICATIONS

MediaTek Inc. "Report of [107#81][NR TEI16] Need-for-Gaps signalling", 3GPP TSG-RAN WG2 Meeting #108 R2-1914914, Resubmission of R2-1913847, Reno, Nevada, USA, Nov. 18-22, 2019.

(Continued)

*Primary Examiner* — Natasha W Cosme
(74) *Attorney, Agent, or Firm* — BAYES PLLC

(57) ABSTRACT

A measurement method for user equipment (UE), a terminal device, and a network device are provided. Said method comprises: UE determining, according to at least one of need for gap information, no-gap measurement capability, and time-frequency location condition, a measurement gap that needs to be configured for a measurement corresponding to a frequency point or a cell in a specified list; and the UE performing measurement according to the measurement gap.

13 Claims, 7 Drawing Sheets

---

UE determines that a measurement gap is needed to be configured for a measurement corresponding to a frequency point or a cell in a designated list according to at least one of measurement gap configuration information, a capability without a measurement gap and a time-frequency position condition — S210

UE performs a measurement according to the measurement gap — S220

(56) References Cited

OTHER PUBLICATIONS

CMCC, "RRM requirements on inter-frequency measurement without gap", 3GPP TSG-RAN WG4 Meeting # 94-e-Bis R4-2003517, Electronic Meeting, Apr. 20-30, 2020.
OPPO, "Discussion on update of NeedForGap", 3GPP TSG-RAN WG2 Meeting #110 R2-2004393, Electronic, Jun. 1-Jun. 12, 2020.
International Search Report in the international application No. PCT/CN2020/093820, mailed on Feb. 20, 2021.
English translation of the Written Opinion of the International Search Authority in the international application No. PCT/CN2020/093820, mailed on Feb. 20, 2021.
Mediatek Inc: "Report of [AT109bis-e] [049] [TEI16] Need for Gap(Mediatek)", 3GPP Draft; R2-2004159, 3rd Generation Partnership Project (3GPP), Mobile Competence Centre; 650, Route Des Lucioles; F-06921 Sophia-Antipolis Cedex; France vol. RAN WG2, no. Online Meeting Apr. 20, 2020-Apr. 30, 2020 May 1, 2020 (May 1, 2020), XP051879395,p. 1-p. 6, 12 pages.
Mediatek Inc: "Introduction of NeedForGap capability for NR measurement", 3GPP Draft; R2-2004811, 3rd Generation Partnership Project (3GPP), Mobile Competence Centre; 650, Route Deslucioles; F-06921 Sophia-Antipolis Cedex; France vol. RAN WG2, no. eMeeting; Jun. 1, 2020 May 22, 2020 (May 22, 2020), XP051888396, p. 21, 28 pages.
Supplementary European Search Report in the European application No. 20939421.2, mailed on Jun. 21, 2023, 10 pages.
Second Office Action of the Chinese application No. 202310219700.9, issued on Oct. 13, 2024, 15 pages with English translation.
First Office Action of the Chinese application No. 202310219700.9, issued on Jul. 18, 2024. 20 pages with English translation.
First Office Action of the European application No. 20939421.2, issued on Apr. 9, 2024. 6 pages.

* cited by examiner

A network device transmits measurement gap configuration information, wherein the measurement gap configuration information comprises measurement gap indication information, and the measurement gap indication information is used for indicating that there is the measurement gap or there is no the measurement gap ⟋S310

FIG. 3

MEASUREMENT METHOD FOR UE, TERMINAL DEVICE AND NETWORK DEVICE

CROSS-REFERENCE TO RELATED APPLICATION

The present disclosure is a continuation application of International Application No. PCT/CN2020/093820, filed on Jun. 1, 2020. The disclosure of the above application is hereby incorporated by reference in its entirety.

BACKGROUND

At present, there are mainly two judgment systems for whether the measurement gap is needed for a measurement of an UE.

In the first system, filter is performed on the cells or bands based on the measurement gap configuration (need for gap) to indicate whether gap is needed for measurement.

In the second system, whether gap is needed is judged according to whether the configuration of measurement frequency points in the current neighbor cell overlaps with the time-frequency position relationship of a BWP activated by the UE. Moreover, due to the compatibility problem that rel-15 and rel-16 have different support capabilities for the intra-frequency and inter-frequency, additional 1 bit indication information (flag) is needed to indicate that the gap is not needed for the inter-frequency measurement.

At present, there is no clear method to define the behavior of UE for the integration of the above two judgment systems in the measurement of UE in the intra-frequency/inter-frequency/inter-Radio Access Technology (inter-RAT), which may lead to a problem of configuration conflict or behavior confusion of UE.

SUMMARY

The present application relates to the field of communications, and more particularly to a measurement method of an user equipment (UE), a terminal device and a network device.

The embodiments of the present disclosure provide a measurement method of an UE, a terminal device and a network device, which can determine that a measurement gap is needed to be used for the measurement of a frequency point or a cell in a designated list to determine that the measurement gap is needed to be configured, and use the measurement gap to perform measurement.

The embodiments of the present disclosure provide a measurement method of an UE. The method includes the following operations.

UE determines that a measurement gap is needed to be configured for a measurement corresponding to a frequency point or a cell in a designated list according to at least one of measurement gap configuration information, a capability without a measurement gap and a time-frequency position condition.

UE performs a measurement according to the measurement gap.

The embodiments of the present disclosure provide a method for configuring a measurement gap for an UE. The method includes the following operations.

A network device transmits measurement gap configuration information. The measurement gap configuration information includes measurement gap indication information, and the measurement gap indication information is used for indicating that there is measurement gap or there is no measurement gap.

The embodiments of the present disclosure provide a terminal device. The terminal device includes a determining module and a measuring module.

The determining module is configured to determine that a measurement gap is needed to be configured for a measurement corresponding to a frequency point or a cell in a designated list according to at least one of measurement gap configuration information, a capability without a measurement gap and a time-frequency position condition.

The measuring module is configured to perform a measurement according to the measurement gap.

The embodiments of the present disclosure provide a network device. The network device includes an indicating module.

The indicating module is configured to transmit measurement gap configuration information. The measurement gap configuration information includes measurement gap indication information, and the measurement gap indication information is used for indicating that there is measurement gap or there is no measurement gap.

The embodiments of the present disclosure provide a terminal device. The terminal device includes a processor and a memory. The memory is configured to store a computer program, and the processor is configured to invoke and run the computer program stored in the memory to perform the method described in any one of the above.

The embodiments of the present disclosure provide a network device. The network device includes a processor and a memory. The memory is configured to store a computer program, the processor is configured to invoke and run the computer program stored in the memory to perform the method described in any one of the above.

The embodiments of the present disclosure provide a chip. The chip includes a processor. The processor is configured to invoke and run a computer program from a memory to cause a device on which the chip is mounted to perform the method described in any one of the above.

The embodiments of the present disclosure provide a chip. The chip includes a processor. The processor is configured to invoke and run a computer program from a memory to cause a device on which the chip is mounted to perform the method described in any one of the above.

The embodiments of the present disclosure provide a computer-readable storage medium for storing a computer program. The computer program causes a computer to perform the method described in any one of the above.

The embodiments of the present disclosure provide a computer-readable storage medium for storing a computer program. The computer program causes a computer to perform the method described in any one of the above.

The embodiments of the present disclosure provide a computer program product. The computer program product includes computer program instructions. The computer program instructions cause a computer to perform the method described in any one of the above.

The embodiments of the present disclosure provide a computer program product. The computer program product includes computer program instructions. The computer program instructions cause a computer to perform the method described in any one of the above.

The embodiments of the present disclosure provide a computer program. The computer program causes a computer to perform the method described in any one of the above.

The embodiments of the present disclosure provide a computer program. The computer program causes a computer to perform the method described in any one of the above.

BRIEF DESCRIPTION OF THE DRAWINGS

FIG. 3 is a flowchart of an implementation of a method 300 for configuring measurement gap for the UE according to the embodiments of the present disclosure.

DETAILED DESCRIPTION

Figure 1:
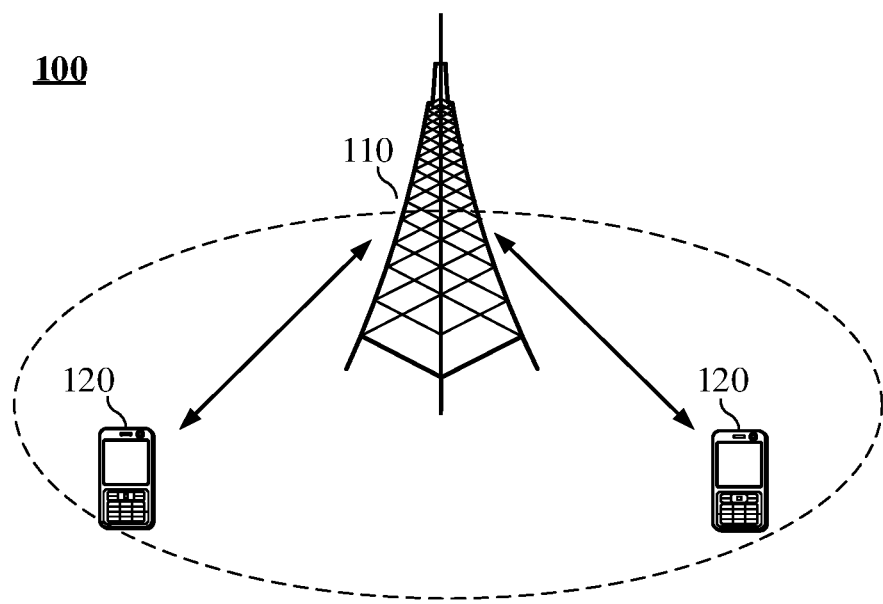
FIG. 1 is a schematic diagram of an application scenario of the embodiments of the present disclosure.

The technical solutions in the embodiments of the present disclosure will be described below with reference to the accompanying drawings in the embodiments of the present disclosure.

It should be noted that the terms "first", "second" and the like in the description and claims of embodiments of the present disclosure and the above attached drawings are used to distinguish similar objects and not be used to describe a specific order or priority. The objects described in the "first" and "second" at the same time may be the same or different.

The technical solutions of the embodiments of the present disclosure can be applicable for various communication systems, for example, a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of a NR system, a LTE-based access to unlicensed spectrum (LTE-U) system, a NR-based access to unlicensed spectrum (NR-U) system, an Universal Mobile Telecommunications System (UMTS), Wireless Local Area Networks (WLAN), Wireless Fidelity (WiFi), 5th-Generation (5G) system or other communication systems, etc.

Generally speaking, traditional communication systems support a limited number of connections and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, etc. The embodiments of the present disclosure may also be applicable for these communication systems.

Alternatively, the communication system in the embodiments of the present disclosure may be applicable for a Carrier Aggregation (CA) scenario, a Dual Connectivity (DC) scenario, or a Standalone (SA) network layout scenario.

The spectrum of the application is not limited in the embodiments of the present disclosure. For example, embodiments of the present disclosure may be applicable for a licensed spectrum or an unlicensed spectrum.

Embodiments of the present disclosure are described in connection with a network device and a terminal device. The terminal device may also be referred as an user equipment (UE), an access terminal, a user unit, a user station, a mobile station, a mobile terminal, a remote station, a remote terminal, a mobile device, a user terminal, a terminal, a wireless communication device, a user agent or a user device, etc. The terminal device may be a STAION (ST) in a WLAN, and may be a cellular phone, a cordless phone, a Session Initiation Protocol (SIP) phone, a Wireless Local Loop (WLL) station, a Personal Digital Assistant (PDA) device, a handheld device with a wireless communication function, a computing device or other processing device connected to a wireless modem, an in-vehicle device, a wearable device, and a terminal device in the next generation communication system such as a NR network, or a terminal device in a future evolved Public Land Mobile Network (PLMN) network, etc.

As an example and not a limitation, in the embodiments of the present disclosure, the terminal device may also be a wearable device. The wearable device may also be called a wearable smart device, which is the general term for the wearable device that is developed using wearable technology for intelligently designed daily wear, such as glasses, gloves, watches, clothing and shoes. A wearable device is a portable device that is worn directly on the body or integrated into the user's clothing or accessories. The wearable device is not only a hardware device, but also implements powerful functions through software support, data interaction, and cloud interaction. In a broad sense, the wearable smart device includes a device that is full-featured, large-scale, capable of implementing complete or partial functions without relying on a smart phone, such as a smart watches or a smart glass, and a device that only focus on a certain type of application function, and needs to cooperate with other devices such as smart phones, such as all kinds of smart bracelets for physical sign monitoring and smart jewelry, etc.

The network device may be a device for communicating with a mobile device, and the network device may be an Access Point (AP) in WLAN, a Base Transceiver Station (BTS) in GSM or CDMA, a NodeB (NB) in WCDMA, an Evolutional Node B (eNB or eNodeB) in LTE, a relay station or an access point, or an in-vehicle device, a wearable device, a network device (gNB) in NR network or a network device in the future evolved PLMN network, etc.

In the embodiments of the present disclosure, a network device provides services for a cell, and a terminal device communicates with the network device through transmission resources (for example, frequency domain resources, or spectrum resources) used by the cell. The cell may be a cell corresponding to a network device (for example, a base station). The cell may belong to a macro base station, or it may belong to a base station corresponding to a Small cell. Herein, the Small cell may include a Metro cell, a Micro cell, a Pico cell and a Femto cell, etc. These Small cells have the characteristics of small coverage and low transmit power, and are suitable for providing high-speed data transmission services.

In the embodiments of the present disclosure, it is determined that a measurement gap is needed to be configured for a measurement corresponding to a frequency point or a cell in a designated list according to at least one of measurement gap configuration information, a capability without a measurement gap and a time-frequency position condition, and a measurement is performed according to the measurement gap. The above method can avoid the problem of configuration conflict or behavior confusion of UE occurred when configuring the measurement gap.

FIG. 1 schematically shows one network device 110 and two terminal devices 120. Alternatively, the wireless communication system 100 may include multiple network devices 110, and the coverage of each network device 110 may include other numbers of terminal devices 120. The embodiments of the present disclosure do not limit this. The embodiments of the present disclosure may be applicable for a terminal device 120 and a network device 110, and may also be applicable for a terminal device 120 and another terminal device 120.

Alternatively, the Wireless Communication System 100 may also include other network entities such as a Mobility Management Entity (MME), an Access and Mobility Management Function (AMF), etc. The embodiments of the present disclosure do not limit this.

It should be understood that the terms "system" and "network" are often used interchangeably herein. The term "and/or" herein is used to describe the association relationship of associated objects, for example, it represents that there may be three relationships. For example, A and/or B may represent the following three cases: A exists alone, A and B exist simultaneously, and B exists alone. The character "|" in the present disclosure generally represents that the relation of between the associated objects before and after is "or".

The embodiments of the present disclosure involve two consideration systems for judging whether gap is needed, specifically as follows.

System 1

Whether a gap is needed is determined based on the measurement gap configuration (need for gap). It is applicable for judging whether gap is needed at band level in an intra-frequency measurement and an inter-frequency measurement. If the UE reports needforgap information (including at least one of the following three: intraFreqNeedForGaps, interFreqNeedForGaps, or interRATNeedForGaps), a filter condition for need of gap (such as BandList) is configured.

System 2

For the intra-frequency measurement and inter-frequency measurement, the gap cannot be needed when following condition is satisfied.

Condition 1: a neighbor cell synchronization signal block (SSB) is within an UE serving cell active bandwidth part (BWP), or a current BWP of the serving cell where the UE is located is an initial BWP.

In addition, for the intra-frequency measurement, Rel-15 supports need for gap and no need for gap, and no additional signaling indication is needed. For the inter-frequency measurement, Rel-15 supports need for gap, and 1 bit UE capability indication information (flag) is introduced in Rel-16 to indicate whether gap is needed.

Figure 2:
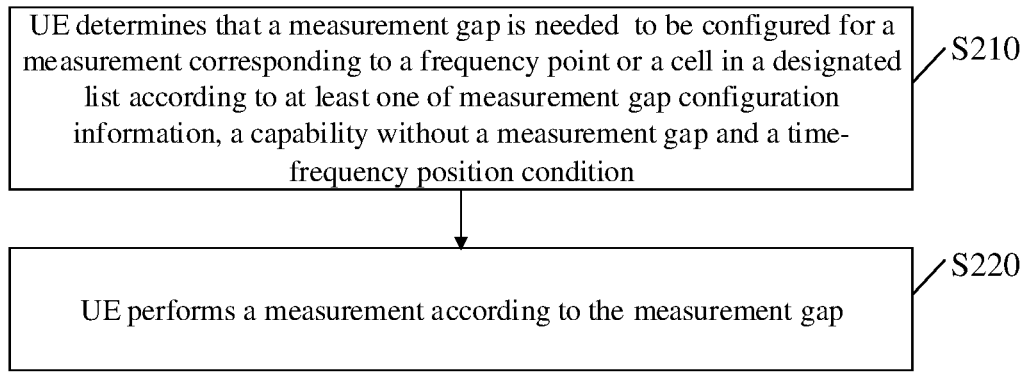
FIG. 2 is a flowchart of an implementation of a measurement method 200 of the UE according to the embodiments of the present disclosure.

Based on the above two judgment systems, the embodiments of the present disclosure provide a measurement method of UE, which may be applicable for the application scenario shown in FIG. 1. FIG. 2 is a flowchart of an implementation of a measurement method 200 of the UE according to the embodiments of the present disclosure. The measurement method 200 of the UE includes the following operations.

In the operation S210, the UE determines that a measurement gap is needed to be configured for a measurement corresponding to a frequency point or a cell in a designated list according to at least one of measurement gap configuration information, a capability without the measurement gap and a time-frequency position condition.

In the operation S220, the UE performs a measurement according to the measurement gap.

The above measurement may include an intra-frequency measurement, an inter-frequency measurement, or an inter-Radio Access Technology (inter-RAT) measurement.

Alternatively, the measurement gap configuration information includes measurement gap indication information, and the measurement gap indication information is used for indicating that there is the measurement gap or there is no the measurement gap.

The above method may further include the following operation. The UE determines that the measurement gap is needed to be configured for the measurement corresponding to the frequency point or the cell in the designated list according to the capability without the measurement gap and/or the time-frequency position condition in response to the measurement gap indication information being used for indicating that there is the measurement gap.

In some embodiments, the above measurement gap configuration information (need for gap) further includes a filter condition. The measurement gap indication information may be represented in 1 bit, and be used for indicating that the gap is needed for the measurement corresponding to the frequency point or the cell, or the gap is not needed for the measurement corresponding to the frequency point or the cell. The filter condition may include target band filter configuration for dynamic need for gap reporting. The signaling configuration of the NR need for gap is as follows:

```
NeedForGapsInfoNR-r16 ::=        SEQUENCE {
    intraFreq-needForGap-r16         NeedForGapsIntraFreqlist-r16,
    interFreq-needForGap-r16         NeedForGapsBandlistNR-r16
}
NeedForGapsIntraFreqlist-r16 ::= SEQUENCE (SIZE (1..
                                     maxNrofServingCells)) OF
NeedForGapsIntraFreq-r16
NeedForGapsBandlistNR-r16 ::=        SEQUENCE (SIZE
                                     (1..maxBands)) OF
NeedForGapsNR-r16
NeedForGapsIntraFreq-r16 ::=     SEQUENCE {
    servCellId-r16                   ServCellIndex,
    gapIndicationIntra-r16              ENUMERATED {gap,
                                     no-gap}
}
NeedForGapsNR-r16 ::=            SEQUENCE {
    bandNR-r16                       FreqBandIndicatorNR,
    gapIndication-r16                ENUMERATED {gap,
                                     no-gap}
}
```

The measurement gap configuration information may be configured by the network device to the terminal device using RRC signaling.

As shown in the above signaling configuration, the above measurement gap indication information may have two values, that is, "gap" and "no-gap", which are used for indicating that the measurement gap is needed and the measurement gap is not needed, respectively. For the intra-frequency measurement, the filter servCellId at cell level is adopted. For the inter-frequency measurement, the filter bandNR at band level is adopted.

In some embodiments, the above operation of determining that the measurement gap is needed for the measurement corresponding to a frequency point or the cell in the designated list includes at least one of following operations.

It is determined that the measurement gap is needed for the measurement corresponding to all frequency points or all cells in the designated list in a case that the measurement gap indication information indicates that there is the measurement gap and the filter condition is not configured;

It is determined that the measurement gap is needed for the measurement corresponding to a first frequency point or a first cell in the designated list in a case that the measurement gap indication information indicates that there is the measurement gap and the filter condition is configured. The first frequency point or the first cell satisfies the filter condition.

Alternatively, the above operation of determining that the measurement gap is needed for the measurement corresponding to the frequency point or the cell in the designated list further includes the following operation.

It is determined that the measurement gap is not needed for the measurement corresponding to the frequency point or the cell in the designated list in a case that the measurement gap indication information indicates that there is no the measurement gap.

The operation of determining that measurement gap is not needed to be configured may include at least the following two situations.

In the first situation, it is determined that the measurement gap is not needed for the measurement corresponding to all frequency points or all cells in the designated list in a case that the measurement gap indication information indicates that there is no measurement gap and the filter condition is not configured.

In the second situation, it is determined that the measurement gap is not needed for the measurement corresponding to frequency points or cells satisfying the filter condition in the designated list in a case that the measurement gap indication information indicates that there is no measurement gap and the filter condition is configured.

In some embodiments, the method further includes the following operations. When the frequency point or the cell in the designated list changes, if a filter condition is updated, the UE re-determines that the measurement gap is needed to be configured for the measurement corresponding to the frequency point or the cell in the designated list according to the capability without the measurement gap and/or the time-frequency position condition, and if a filter condition is not updated, the UE does not update information that the measurement gap is needed to be configured for the measurement corresponding to the frequency point or the cell in the designated list, or the UE determines that a measurement gap is needed to be configured for a measurement corresponding to a newly added frequency point or a cell according to a predetermined period.

The above manners define the filter behavior of the UE to the filter condition, and the implementation complexity can be reduced by using the third manner.

Alternatively, the reasons that the above frequency point or cell changes include addition or release of secondary cells, cell switching, and the like.

Alternatively, the time-frequency position condition in the above operation S220 includes a position relationship between a neighbor cell synchronization signal block (SSB) and an UE serving cell active bandwidth part (BWP).

Based on the above time-frequency position condition, in some embodiments, when the measurement is an intra-frequency measurement, it is determined that the measurement gap is not needed to be configured for the measurement corresponding to the frequency point or the cell in response to at least one of following conditions being satisfied.

A neighbor cell SSB is within an UE serving cell active BWP.

A current BWP of the serving cell where the UE is located is an initial BWP.

When the measurement is the inter-frequency measurement, whether the measurement gap is needed in the above operation may be determined according to capability without the measurement gap of the UE in addition to the time-frequency position condition.

In some embodiments, the above capability without the measurement gap of the UE includes the following two situations.

UE has a capability of inter-frequency without the measurement gap (MG).

UE does not have the capability of inter-frequency without the measurement gap.

The UE having the capability of inter-frequency without the measurement gap represents that the UE may not use the measurement gap when performing the inter-frequency measurement.

The UE not having the capability of inter-frequency without the measurement gap represents that the UE has to use the measurement gap when performing the inter-frequency measurement.

Alternatively, 1 bit capability indication information (flag) is used to indicate whether the UE has the capability of inter-frequency without the measurement gap. For example, when the flag is yes/1, it indicates that the UE has the capability of inter-frequency without the measurement gap. When the flag is no/0, it indicates that the UE does not have the capability of inter-frequency without the measurement gap.

In some embodiments, the manners for determining whether the measurement gap is needed for the measurement corresponding to the frequency point or cell in the designated list according to the capability without a measurement gap and/or the time-frequency position condition include at least the following manners.

In a first manner, in case that the network measurement is an inter-frequency measurement, when the measurement gap is needed for the measurement corresponding to the frequency point or the cell in the designated list and the UE has an capability of inter-frequency without the measurement gap, it is determined that the measurement gap is not needed to be configured for the measurement corresponding to the frequency point or the cell in the designated list in response to at least one of following conditions being satisfied.

A neighbor cell SSB is within an UE serving cell active bandwidth part (BWP).

A current BWP of the serving cell where the UE is located is an initial BWP.

In a second manner, in a case that the network measurement is an inter-frequency measurement, when the measurement gap is needed for the measurement corresponding to the frequency point or the cell in the designated list and the UE does not have a capability of inter-frequency without the measurement gap, it is determined that the measurement gap is needed to be configured for the measurement corresponding to the frequency point or the cell in the designated list.

In the third manner, in the case that the network measurement is an inter-frequency measurement, when the measurement corresponding to the frequency point or the cell in the designated list satisfies that the measurement gap is not needed, it is determined that the measurement gap is not needed to be configured for the measurement corresponding to the frequency point or the cell in the designated list. In this case, it is not necessary to consider whether UE has the capability of inter-frequency without the measurement gap.

In the fourth manner, in the case that the network measurement is an inter-frequency measurement, when the measurement corresponding to the frequency point or the cell in the designated list satisfies that the measurement gap is not needed and UE does not have a capability of inter-frequency without the measurement gap, it is determined that the measurement gap is not needed to be configured for the measurement corresponding to the frequency point or the cell in the designated list.

For the inter-RAT measurement, the inter-RAT measurement may be regarded as the inter-frequency measurement with flag=no/0, that is, the inter-frequency measurement in which UE does not have the capability of inter-frequency without the measurement gap. In a manner similar to the above, for the inter-RAT measurement, the manner of determining whether the measurement gap is needed for the measurement corresponding to the frequency point or cell in the designated list according to the capability without the measurement gap and/or the time-frequency position condition in the above operation S220 may further include the following operations.

In the case that the measurement is an inter-RAT measurement, when the measurement gap is needed for the measurement corresponding to the frequency point or the cell in the designated list, it is determined that the measurement gap is needed for the measurement corresponding to the frequency point or the cell in the designated list.

Alternatively, in the case that the measurement is an inter-RAT measurement, when the measurement gap is not needed for the measurement corresponding to the frequency point or the cell in the designated list, it is determined that the measurement gap is not needed for the measurement corresponding to the frequency point or the cell in the designated list.

In some embodiments, the method further includes the following operations.

BWP switching is performed.

After the BWP switching is completed, UE determines that the measurement gap is needed for the measurement corresponding to the frequency point or the cell in the designated list according to the measurement gap indication information and the filter condition.

Alternatively, the trigger condition of the above BWP switching includes at least one of the following.

Downlink Control Information (DCI) indicates that BWP switching is triggered.

BWP switching is triggered through a timer.

BWP switching is triggered through RRC signaling.

By adopting the above processes, under the premise of determining that the measurement gap is needed for the measurement corresponding to the frequency point or the cell, the UE can re-determine whether the measurement gap is needed to be configured for the measurement corresponding to the frequency point or the cell when the frequency position condition changes.

From the above processes, it can be seen that according to the measurement method of the UE provided by the embodiments of the present disclosure, the UE can determine whether gap is needed for the intra-frequency measurement, the inter-frequency measurement and the inter-RAT measurement according to needforgap, and the UE can further determine whether a gap is needed to be configured according to the capability without need of the gap in the intra-frequency measurement and the inter-frequency measurement and the time-frequency position condition. The above embodiments define the behavior of the UE and integrate the above two judgment systems or criteria to determine whether the gap is needed for the UE to perform measurement.

The present disclosure is described in detail with respect to the intra-frequency measurement, inter-frequency measurement and inter-RAT measurement respectively in connection with specific embodiments.

Embodiment 1

This embodiment is aimed at the intra-frequency measurement.

If at least one measurement object (MO) of the intra-frequency measurement is configured and at least one intra-frequency frequency point is configured in each MO, the intra-frequency measurement is needed to be performed. If no MO of the intra-frequency measurement is configured, or no intra-frequency frequency point is configured in the MO, the intra-frequency measurement is not needed to be performed. In a case that the intra-frequency measurement is needed to be performed, the following operations are used to determine whether the measurement gap is needed for the UE.

In the first operation, whether the measurement gap is needed for the measurement corresponding to the frequency point or the cell in the designated list is determined according to the measurement gap indication information in the measurement gap configuration information and the filter condition, that is, the above system 1. In this embodiment, the indication information is represented by Intra-f needforgap and the filter condition is represented by NeedForGapsBandlist. The specific manners are as follows.

If Intra-f needforgap indicates gap, that is, the measurement gap is needed, and NeedForGapsBandlist is configured, the frequency points or cells in the designated list are filtered by using NeedForGapsBandlist, and it is determined that the measurement gap is needed for the measurement corresponding to the frequency points or cells satisfying NeedForGapsBandlist in the designated list.

If Intra-f needforgap indicates gap and NeedForGapsBandlist is not configured, filter is not needed, and it is determined that the measurement gap is needed for the measurement corresponding to all frequency points or all cells in the designated list.

If Intra-f needforgap indicates no-gap, that is, the measurement gap is not needed, and NeedForGapsBandlist is configured, the frequency points or cells in the designated list are filtered by using NeedForGapsBandlist, and it is determined that the measurement gap is not needed for the measurement corresponding to the frequency points or cells satisfying NeedForGapsBandlist in the designated list.

If Intra-f needforgap indicates no-gap and NeedForGapsBandlist is not configured, filter is not needed, and it is determined that the measurement gap is not needed for the measurement corresponding to all frequency points or all cells in the designated list.

In the second operation, whether the condition that gap is not needed for the intra-frequency measurement is satisfied is determined according to the current configuration state of BWP, that is, the above system 2. The examples are as follows.

When the measurement gap is needed for the measurement corresponding to the frequency point or cell, whether the at least one of the following conditions is satisfied is judged.

The neighbor cell SSB is in an UE serving cell active BWP.

The current BWP of the serving cell where the UE is located is the initial BWP.

If at least one of the above conditions is satisfied, it is determined that the gap is not needed to be used for the measurement corresponding to the frequency point or cell. Otherwise, the gap may still be used for measurement.

In the third operation, BWP switching is performed.

The trigger condition of the BWP switching at least includes the following three conditions: DCI trigger, timer trigger or RRC signaling. Measurement is suspended during the process of BWP switching.

In the fourth operation, the above second operation is returned to be performed after the BWP switching is completed, and whether the measurement gap is needed to be used for the measurement corresponding to the frequency point or the cell is re-judged.

The embodiment provides a method for determining whether a gap is configured for the intra-frequency measurement of a UE, which solves the problem of possible behavior confusion of the UE and improves the cooperative effect of a network and a terminal.

Embodiment 2

This embodiment is aimed at inter-frequency measurement. In a case of performing inter-frequency measurement, the following operations are used to determine whether the measurement gap is needed for the UE.

In the first operation, whether the measurement gap is needed for the measurement corresponding to the frequency point or the cell in the designated list is determined according to the measurement gap indication information in the measurement gap configuration information and the filter condition, that is, the above system 1. In this embodiment, the indication information is represented by Inter-f needforgap and the filter condition is represented by NeedForGapsBandlist. The specific manners are as follows.

If the Inter-f needforgap indicates gap, that is, the measurement gap is needed, and the NeedForGapsBandlist is configured, the frequency points or cells in the designated list are filtered by using NeedForGapsBandlist, and it is determined that the measurement gap is needed for the measurement corresponding to the frequency points or cells satisfying NeedForGapsBandlist in the designated list.

If Inter-f needforgap indicates gap and NeedForGapsBandlist is not configured, filter is not needed, and it is determined that the measurement gap is needed for the measurement corresponding to all frequency points or all cells in the designated list.

If the Inter-f needforgap indicates no-gap, that is, the measurement gap is not needed, and the NeedForGapsBandlist is configured, the frequency points or cells in the designated list are filtered by using NeedForGapsBandlist, and it is determined that the measurement gap is not needed for the measurement corresponding to the frequency points or cells satisfying NeedForGapsBandlist in the designated list.

If the Inter-f needforgap indicates no-gap and the NeedForGapsBandlist is not configured, filter is not needed, and it is determined that the measurement gap is not needed for the measurement corresponding to all frequency points or all cells in the designated list.

In the second operation, whether the condition that gap is not needed for the inter-frequency measurement is satisfied is determined according to the capability without measurement gap and the current configuration state of BWP. The capability without measurement gap of UE may indicate whether UE has the capability of inter-frequency without the measurement gap. In this embodiment, a 1 bit flag may be used to indicate whether the UE has the capability of inter-frequency without the measurement gap. In this embodiment, when flag indicates yes/1, it indicates that UE has the capability of inter-frequency without the measurement gap, and when flag indicates no/0, it indicates that UE does not have the capability of inter-frequency without the measurement gap.

The determination manner includes at least one of the following manners.

In the first manner, when the measurement gap is needed for the measurement corresponding to the filtered frequency points or cells, if the flag indicates yes/1, the manner of the above system 2 is adopted for determination. For example, whether the at least one of the following conditions is satisfied is judged.

The neighbor cell SSB is in an UE serving cell active BWP.

The current BWP of the serving cell where the UE is located is the initial BWP.

If the at least one of the above conditions is satisfied, it is determined that the gap is not needed to be used for the measurement corresponding to the frequency points or cells. Otherwise, the gap may still be used for measurement.

In the second manner, when the measurement gap is needed for the measurement corresponding to the filtered frequency points or cells, if flag indicates no/0, it is determined that the measurement gap is needed to be used for the measurement corresponding to the frequency points or cells.

In the third manner, when the measurement gap is needed for the measurement corresponding to the filtered frequency points or cells, there is no need to further determine the indication of the flag, i.e., it is determined that the measurement gap is needed to be used for the measurement corresponding to the frequency points or cells.

In the fourth manner, when the measurement gap is not needed for the measurement corresponding to the filtered frequency points or cells, there is no need to further determine the indication of the flag, i.e., it is determined that the measurement gap is not needed to be used for the measurement corresponding to the frequency points or cells.

In the fifth, when the measurement gap is not needed for the measurement corresponding to the filtered frequency points or cells, if flag indicates no/0, it is determined that the measurement gap is not needed to be used for the measurement corresponding to the frequency points or cells.

In the sixth manner, when the measurement gap is not needed for the measurement corresponding to the filtered frequency points or cells, if the flag indicates no/0, the UE considers that the configuration is wrong and the UE can ignore it.

In the seventh manner, when the measurement gap is not needed for the measurement corresponding to the filtered frequency points or cells, if the flag indicates yes/1, it is determined that the measurement gap is not needed to be used for the measurement corresponding to the frequency points or cells.

In the third operation, BWP switching is performed.

The trigger condition of the BWP switching at least includes the following three conditions: DCI trigger, timer trigger or RRC signaling. Measurement is suspended during the process of BWP switching.

In the fourth operation, the above second operation is returned to be performed after the BWP switching is completed, and whether the measurement gap is needed to be used for the measurement corresponding to the frequency point or the cell is re-judged.

The embodiment provides a method for determining whether a gap is configured for the inter-frequency measurement of a UE, which solves the problem of possible behavior confusion of the UE and improves the cooperative effect of a network and a terminal. At the same time, it takes into account the performance compatibility of Rel-15 UE and Rel-16 enhance UE.

Embodiment 3

This embodiment is aimed at inter-RAT measurement. The inter-RAT measurement may be regarded as equivalent to the inter-frequency measurement in which UE does not have the capability of inter-frequency without the measurement gap, such as the above inter-frequency measurement in which the flag indicates no/0. In the case of performing inter-RAT measurement, the following operations are used to determine whether the measurement gap is needed for the UE.

In the first operation, whether the measurement gap is needed for the measurement corresponding to the frequency point or the cell in the designated list is determined according to the indication information in the measurement gap configuration information and the filter condition, that is, the above system 1. In this embodiment, the indication information is represented by Inter-RAT needforgap, and the filter condition is represented by NeedForGapsBandlist. The specific manners are as follows.

If the Inter-RAT needforgap indicates gap, that is, the measurement gap is needed, and the NeedForGapsBandlist is configured, the frequency points or cells in the designated list are filtered by using NeedForGapsBandlist, and it is determined that the measurement gap is needed for the measurement corresponding to the frequency points or cells satisfying NeedForGapsBandlist in the designated list.

If Inter-RAT needforgap indicates gap and NeedForGapsBandlist is not configured, filter is not needed, and it is determined that the measurement gap is needed for the measurement corresponding to all frequency points or all cells in the designated list.

If the Inter-RAT needforgap indicates no-gap, that is, the measurement gap is not needed, and the NeedForGapsBandlist is configured, the frequency points or cells in the designated list are filtered by using NeedForGapsBandlist, and it is determined that the measurement gap is not needed for the measurement corresponding to the frequency points or cells satisfying NeedForGapsBandlist in the designated list.

If the Inter-RAT needforgap indicates no-gap and the NeedForGapsBandlist is not configured, filter is not needed, and it is determined that the measurement gap is not needed for the measurement corresponding to all frequency points or all cells in the designated list.

In the second operation, at this time, it is understood by default that UE does not have capability without the measurement gap. Therefore, the current configuration state of BWP is not considered, that is, the above system 2 is not used for further judgment.

When the measurement gap is needed for the measurement corresponding to the above frequency point or the cell, it is determined that the measurement gap is needed to be used for the measurement corresponding to the above frequency point or the cell.

When the measurement gap is not needed for the measurement corresponding to the frequency point or the cell, it is determined that the measurement gap is not needed to be used for the measurement corresponding to the above frequency point or the cell. Alternatively, when the measurement gap is not needed for the measurement corresponding to the frequency point or the cell, it is considered as an error configuration and the UE can ignore it.

The embodiment provides a method for determining whether a gap is configured for the inter-RAT measurement of UE, which solves the problem of possible behavior confusion of the UE, and improves the cooperative effect of the network and the terminal.

Embodiment 4

This embodiment is aimed at the above embodiments 1, 2 and 3, in the measurement process, if the frequency points or cells in the designated list change, the frequency points or cells in the designated list may be re-filtered by using the following manners.

In the first manner, if serving cells (number) change and the network updates the filter condition (such as NeedForGapsBandlist), the UE re-filters all the frequency points or all cells in the designated list. That is, whether the measurement gap is needed for all the frequency points or all cells in the designated list is re-determined in connection with the indication information (gap or no-gap) in the measurement gap configuration information. Alternatively, the UE re-determines whether the measurement gap is needed for all the frequency points or all cells in the designated list according to the indication of DCI or RRC signaling.

In the second manner, if serving cells (number) change and the network does not update the filter condition (such as NeedForGapsBandlist), the UE does not need to update the information of whether the gap is needed to be configured for the measurement corresponding to the frequency point or cell, and the UE may still use the previous RRC configuration.

In the third manner, if the serving cells (number) change and the network does not update the filter condition (such as NeedForGapsBandlist), the UE may update and refresh semi-statically according to the predetermined period. For example, UE determines whether the measurement gap is needed for the measurement corresponding to the newly added frequency points or the cells according to the predetermined period. Alternatively, the UE may filter only the newly added frequency points or cells in the designated list. That is, UE determines whether the measurement gap is needed to be configured for newly added frequency points or cells in the designated list in combination with the indication information (gap or no-gap), in the measurement gap configuration information. The above semi-static update and refresh may be indicated by Timer activation or RRC signaling.

The reasons for the change of the frequency points or cells include but are not limited to the addition of secondary cells, the release of secondary cells and the cell switching.

The embodiment defines the filter behavior of the UE to the filter condition in the measurement gap configuration information, and provides three implementation possibilities. The implementation complexity can be reduced through the third manner.

The embodiments of the present disclosure also provide a method for configuring a measurement gap for UE, which may be applicable for the application scenario shown in FIG. 1. FIG. 3 is a flowchart of an implementation of a method 300 for configuring a measurement gap for the UE according to the embodiments of the present disclosure. The method 300 includes the following operations.

In operation S310, a network device transmits measurement gap configuration information, the measurement gap configuration information includes measurement gap indication information, and the measurement gap indication information is used for indicating that there is measurement gap or there is no measurement gap.

Alternatively, the measurement gap configuration information further includes the measurement gap indication information.

In some embodiments, it is indicated that the measurement gap is needed for a measurement corresponding to all frequency points or all cells in a designated list in a case that the measurement gap indication information indicates that there is the measurement gap and a filter condition is not configured.

It is indicated that the measurement gap is needed for the measurement corresponding to a first frequency point or a first cell in the designated list in a case that the measurement gap indication information indicates that there is the measurement gap and the filter condition is configured, wherein the first frequency point or the first cell satisfies the filter condition.

In some embodiments, the method further includes the following operation.

It is indicated that the measurement gap is not needed for the measurement corresponding to the frequency point or the cell in the designated list in a case that the measurement gap indication information indicates that there is no measurement gap.

Figure 4:
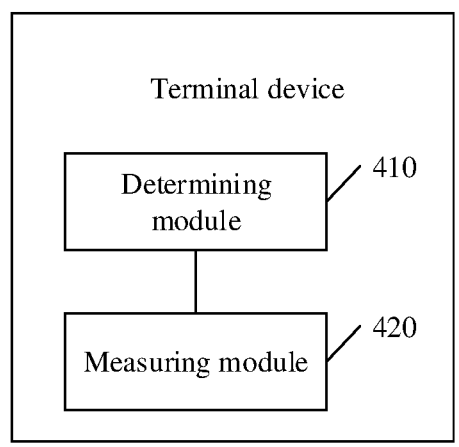
FIG. 4 is a schematic structural diagram of the terminal device 400 according to the embodiments of the present disclosure.

The embodiments of the present disclosure also provide a terminal device. FIG. 4 is a schematic structural diagram of the terminal device 400 according to the embodiments of the present disclosure. The terminal device includes a determining module 410 and a measuring module 420.

The determining module 410 is configured to determine that a measurement gap is needed to be configured for a measurement corresponding to a frequency point or a cell in a designated list according to at least one of measurement gap configuration information, a capability without a measurement gap and a time-frequency position condition.

The measuring module is configured to perform a measurement according to the measurement gap.

In some embodiments, the measurement gap configuration information includes measurement gap indication information, and the measurement gap indication information is used for indicating that there is measurement gap or there is no measurement gap.

In some embodiments, the determining module 410 is configured to determine that the measurement gap is needed to be configured for the measurement corresponding to the frequency point or the cell in the designated list according to the capability without the measurement gap and/or the time-frequency position condition if the measurement gap indication information is used for indicating that there is the measurement gap.

In some embodiments, the measurement gap configuration information further includes a filter condition, and the determining module is configured to: determine that the measurement gap is needed for the measurement corresponding to all frequency points or all cells in the designated list in a case that the measurement gap indication information indicates that there is measurement gap and the filter condition is not configured; and determine that the measurement gap is needed for the measurement corresponding to a first frequency point or a first cell in the designated list in a case that the measurement gap indication information indicates that there is measurement gap and the filter condition is configured, wherein the first frequency point or the first cell satisfies the filter condition.

In some embodiments, the determining module 410 is further configured to determine that the measurement gap is not needed for the measurement corresponding to the frequency point or the cell in the designated list in a case that the measurement gap indication information indicates that there is no measurement gap.

In some embodiments, the measurement includes at least one of an intra-frequency measurement, an inter-frequency measurement, or an inter-RAT measurement.

In some embodiments, the capability without the measurement gap includes that: the UE has a capability of inter-frequency without the measurement gap and/or the UE does not have the capability of inter-frequency without the measurement gap.

The UE having the capability of inter-frequency without the measurement gap represents that the UE is able to not use the measurement gap when performing the inter-frequency measurement.

The UE not having the capability of inter-frequency without the measurement gap represents that the UE has to use the measurement gap when performing the inter-frequency measurement.

In some embodiments, the time-frequency location condition includes a position relationship between a neighbor cell synchronization signal block (SSB)/a physical broadcast channel block and a UE serving cell active bandwidth part (BWP).

In some embodiments, the terminal device further includes an acquisition module.

The acquisition module is configured to acquire the capability without the measurement gap and/or the time-frequency position condition.

In some embodiments, the determining module is further configured to: when the measurement is an intra-frequency measurement, determine that the measurement gap is not needed to be configured for the measurement corresponding to the frequency point or the cell in response to at least one of following conditions being satisfied: a neighbor cell synchronization signal block (SSB)/physical broadcast channel block being within a UE serving cell active bandwidth part (BWP); or a current BWP of the serving cell where the UE is located being an initial BWP.

In some embodiments, the determining module is further configured to: in a case that the measurement is an inter-frequency measurement, when the measurement gap is needed for the measurement corresponding to the frequency point or the cell in the designated list and the UE has a capability of inter-frequency without the measurement gap, determine that the measurement gap is not needed to be configured for the measurement corresponding to the frequency point or the cell in the designated list in response to at least one of following conditions being satisfied: a neighbor cell synchronization signal block (SSB) being within an UE serving cell active bandwidth part (BWP); or a current BWP of the serving cell where the UE is located being an initial BWP.

In some embodiments, the determining module 410 is further configured to: in a case that the measurement is an inter-frequency measurement, when the measurement gap is needed for the measurement corresponding to the frequency point or the cell in the designated list and the UE does not have a capability of inter-frequency without the measurement gap, determine that the measurement gap is needed to be configured for the measurement corresponding to the frequency point or the cell in the designated list.

In some embodiments, the determining module 410 is further configured to: in the case that the measurement is an inter-frequency measurement, when the measurement corresponding to the frequency point or the cell in the designated list satisfies that the measurement gap is not needed, determine that the measurement gap is not needed to be configured for the measurement corresponding to the frequency point or the cell in the designated list.

In some embodiments, the determining module 410 is further configured to: in the case that the measurement is an inter-frequency measurement, when the measurement corresponding to the frequency point or the cell in the designated list satisfies that the measurement gap is not needed and UE does not have a capability of inter-frequency without the measurement gap, determine that the measurement gap is not needed to be configured for the measurement corresponding to the frequency point or the cell in the designated list.

In some embodiments, the determining module 410 is configured to: in the case that the measurement is an inter-RAT measurement, when the measurement gap is needed for the measurement corresponding to the frequency point or the cell in the designated list, determine that the measurement gap is needed to be configured for the measurement corresponding to the frequency point or the cell in the designated list.

In some embodiments, the determining module 410 is further configured to: in the case that the measurement is an inter-RAT measurement, when the measurement gap is not needed for the measurement corresponding to the frequency point or the cell in the designated list, determine that the measurement gap is not needed to be configured for the measurement corresponding to the frequency point or the cell in the designated list.

In some embodiments, the determining module 410 is further configured to perform bandwidth part (BWP) switching and determine, after the BWP switching is completed, that the measurement gap is needed for the measurement corresponding to the frequency point or the cell in the designated list according to the measurement gap indication information and the filter condition.

In some embodiments, the determining module 410 is further configured to: when the frequency point or the cell in the designated list changes, if a filter condition is updated, re-determine, according to the capability without the measurement gap and/or the time-frequency position condition, that measurement gap is needed to be configured for the measurement corresponding to the frequency point or the cell in the designated list; and if a filter condition is not updated, not update information that the measurement gap is needed to be configured for the measurement corresponding to the frequency point or the cell in the designated list, or determine that a measurement gap is needed to be configured for a measurement corresponding to a newly added frequency point or a cell according to a predetermined period.

It should be understood that the above and other operations and/or functions of the modules in the terminal device according to embodiments of the present disclosure are used for implementing the corresponding flows of the terminal device in the method 200 of FIG. 2 respectively. The corresponding flows are not repeated here for the sake of brevity.

Figure 5:
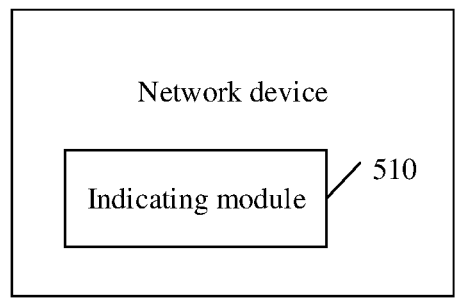
FIG. 5 is a schematic structural diagram of the network device 500 according to the embodiments of the present disclosure.

The embodiments of the present disclosure also provide a network device. FIG. 5 is a schematic structural diagram of the network device 500 according to the embodiments of the present disclosure. The network device 500 includes an indicating module 510.

The indicating module 510 is configured to transmit measurement gap configuration information. The measurement gap configuration information includes measurement gap indication information, and the measurement gap indication information is used for indicating that there is measurement gap or there is no measurement gap.

In some embodiments, the measurement gap configuration information further includes the measurement gap indicating information.

In some embodiments, the indicating module 510 is configured to indicate that the measurement gap is needed for a measurement corresponding to all frequency points or all cells in a designated list in a case that the measurement gap indication information indicates that there is measurement gap and an filter condition is not configured, and indicate that the measurement gap is needed for the measurement corresponding to a first frequency point or a first cell in the designated list in a case that the measurement gap indication information indicates that there is measurement gap and the filter condition is configured. The first frequency point or the first cell satisfies the filter condition.

In some embodiments, the indicating module 510 is further configured to indicate that the measurement gap is not needed for the measurement corresponding to the frequency point or the cell in the designated list in a case that the measurement gap indication information indicates that there is no measurement gap.

It should be understood that the above and other operations and/or functions of the modules in the network device according to embodiments of the present disclosure are used for implementing the corresponding flows of the terminal device in the method 300 of FIG. 3 respectively. The corresponding flows are not repeated here for the sake of brevity.

Figure 6:
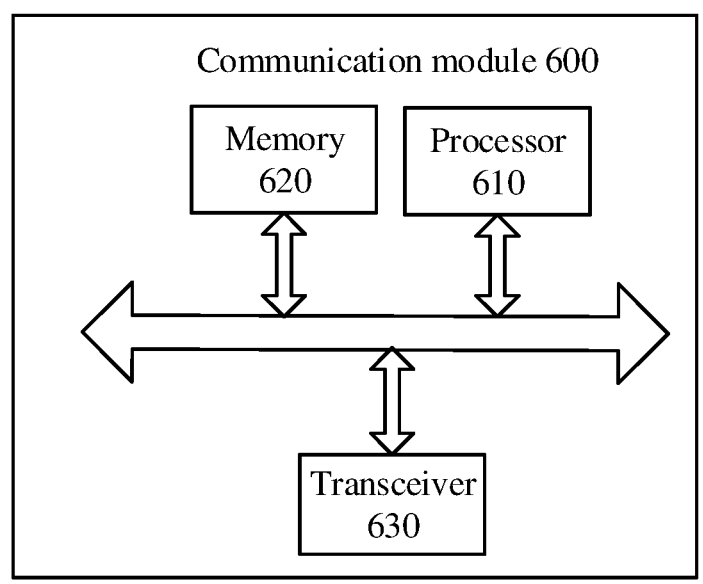
FIG. 6 is a schematic structural diagram of a communication device 600 according to the embodiments of the present disclosure.

FIG. 6 is a schematic structural diagram of a communication device 600 according to the embodiments of the present disclosure. The communication device 600 shown in FIG. 6 includes a processor 610. The processor may invoke and run a computer program from memory to implement the methods in the embodiments of the present disclosure.

Alternatively, as shown in FIG. 6, the communication device 600 may also include a memory 620. The processor 610 may invoke and run a computer program from memory 620 to implement the methods in embodiments of the present disclosure.

The memory 620 may be a separate device independent of the processor 610 or may be integrated in the processor 610.

Alternatively, as shown in FIG. 6, the communication device 600 may further include a transceiver 630. The processor 610 may control the transceiver 630 to communicate with other devices. Specifically, the transceiver 630 may transmit information or data to other devices or receive information or data transmitted by other devices.

The transceiver 630 may include a transmitter and a receiver. The transceiver 630 may further include antennas, and the number of the antennas may be one or more.

Alternatively, the communication device 600 may be a terminal device of the embodiments of the present disclosure. The communication device 600 may implement the corresponding processes implemented by the terminal device in the respective methods of the embodiment of the present disclosure. Elaborations are omitted herein for the sake of brevity.

Alternatively, the communication device 600 may be a network device of the embodiments of the present disclosure. The communication device 600 may implement the corresponding processes implemented by the network device in the respective methods of the embodiment of the present disclosure. Elaborations are omitted herein for the sake of brevity.

Figure 7:
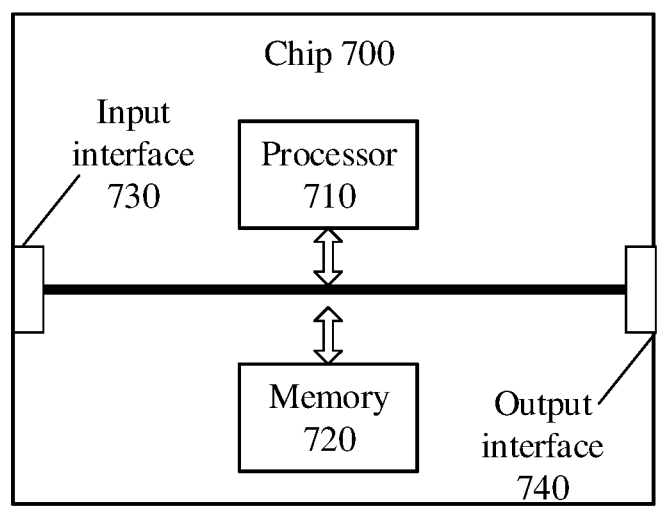
FIG. 7 is a schematic structural diagram of a chip 700 according to the embodiments of the present disclosure.

FIG. 7 is a schematic structural diagram of a chip 700 according to the embodiments of the present disclosure. Chip 700 shown in FIG. 7 includes a processor 710. The processor 710 may invoke and run a computer program from memory to implement the methods in embodiments of the present disclosure.

Alternatively, as shown in FIG. 7, the chip 700 may further include a memory 720. The processor 710 may invoke and run a computer program from the memory 720 to implement the methods in embodiments of the present disclosure.

The memory 720 may be a separate device independent of the processor 710 or may be integrated in the processor 710.

Alternatively, the chip 700 may also include an input interface 730. The processor 710 may control the input interface 730 to communicate with other devices or chips. Specifically, information or data transmitted by other devices or chips can be obtained through the input interface 730.

Alternatively, the chip 700 may also include an output interface 740. The processor 710 may control the output interface 740 to communicate with other devices or chips. Specifically, information or data may be output to other devices or chips through the output interface 740.

Alternatively, the chip may be applicable for the terminal device in the embodiments of the present disclosure, and the chip may implement corresponding processes implemented by the terminal device in the respective methods of the embodiments of the present disclosure. Elaborations are omitted herein for the sake of brevity.

It should be understood that the chips referred to in embodiments of the present disclosure may also be referred to as system level chip, system ship, chip system or system-on-chip or the like.

The processor mentioned above may be a general purpose processor, a digital signal processor (DSP), a field programmable gate array (FPGA), an application specific integrated circuit (ASIC), or other programmable logic devices, transistor logic devices, discrete hardware components, and the like. The general purpose processor mentioned above may be a microprocessor or any conventional processor or the like.

The memory mentioned above may be a volatile memory or a non-volatile memory or may include both a volatile memory and a non-volatile memory. The non-volatile memory may be read-only memory (ROM), programmable ROM (PROM), erasable programmable read-only memory (EPROM), electrically erasable programmable read-only memory (EEPROM) or flash memory. The volatile memory may be a random access memory (RAM).

It should be understood that the above memory is exemplary but not limiting. For example, the memory in embodiments of the present disclosure may also be static random access memory (SRAM), dynamic random access memory (DRAM), synchronous dynamic random access memory (SDRAM), double data rate synchronous dynamic random access memory (SDRAM), enhanced synchronous dynamic random access memory (ESDRAM), synchronous link DRAM (SLDRAM), direct Rambus RAM (DR RAM), etc. That is, the memory in embodiments of the present disclosure is intended to include but not limited to these and any other suitable types of memory.

The above embodiments may be implemented in whole or in part by software, hardware, firmware or any combination thereof. When implemented in software, the embodiments may be implemented in whole or in part in the form of a computer program product. The computer program product includes one or more computer instructions. When the computer program instructions are loaded and executed on a computer, the flow or function described in accordance with embodiments of the present disclosure is generated in whole or in part. The computer may be a general purpose computer, a special purpose computer, a computer network, or other programmable device. The computer instructions may be stored in a computer-readable storage medium, or be transmitted from one computer-readable storage medium to another. For example, the computer instructions may be transmitted from a Web site, computer, server, or data center to another Web site, computer, server, or data center via wired (e.g. coaxial cable, optical fiber, Digital Subscriber Line (DSL)) or wireless (e.g. infrared, wireless, microwave, etc.). The computer-readable storage medium may be any usable medium accessible to a computer or a data storage device such as a server, data center, etc. containing one or more usable media integration. The usable media may be magnetic media (e.g. floppy disk, hard disk, magnetic tape), optical media (e.g. DVD), or semiconductor media (e.g. Solid State Disk (SSD)), etc.

It should be understood that in various embodiments of the present disclosure, the size of the sequence number of the above respectively processes does not mean the order of execution, and the execution order of each process should be determined by its function and inherent logic, and should not be limited in any way to the implementation process of the embodiments of the present disclosure.

Those skilled in the art will clearly appreciate that, for convenience and brevity of description, the specific operating processes of the above systems, apparatuses and units may refer to the corresponding processes in the aforementioned method embodiments. Elaborations are omitted herein.

The above description is only the specific implementation of the present disclosure, but the scope of protection of the present disclosure is not limited thereto. Any technical person familiar with the technical field can easily think of changes or substitutions within the technical scope disclosed in the present disclosure, which should be covered within the scope of protection of the present disclosure. Therefore, the scope of protection of the present disclosure shall be subject to the scope of protection of claims.

The invention claimed is:

1. A measurement method of a user equipment (UE), comprising:
   determining, by the UE, according to measurement gap configuration information, a capability without a measurement gap and a time-frequency position condition, that a measurement gap is not needed to be configured for a measurement corresponding to a frequency point or a cell in a designated list, wherein the time-frequency position condition comprises a position relationship between a neighbor cell synchronization signal block (SSB) and an UE serving cell active bandwidth part (BWP); and performing, by the UE, a measurement without the measurement gap, wherein the measurement gap configuration information comprises measurement gap indication information, and the measurement gap indication information indicates that there is no measurement gap, wherein the measurement comprises an inter-frequency measurement.

2. The method of claim 1, wherein the capability without the measurement gap comprises that: the UE has a capability of inter-frequency without the measurement gap and/or the UE does not have the capability of inter-frequency without the measurement gap, wherein, the UE having the capability of inter-frequency without the measurement gap represents that the UE is able to not use the measurement gap when performing the inter-frequency measurement; and the UE not having the capability of inter-frequency without the measurement gap represents that the UE has to use the measurement gap when performing the inter-frequency measurement.

3. The method of claim 1, further comprising:
acquiring, by the UE, the capability without the measurement gap and/or the time-frequency position condition.

4. The method of claim 1, further comprising:
when the measurement gap is needed for the measurement corresponding to the frequency point or the cell in the designated list and the UE has a capability of inter-frequency without the measurement gap, determining that the measurement gap is not needed to be configured for the measurement corresponding to the frequency point or the cell in the designated list in response to at least one of following conditions being satisfied:
a neighbor cell SSB being within an UE serving cell active BWP; or
a current BWP of the serving cell where the UE is located being an initial BWP.

5. The method of claim 1, further comprising:
when the measurement gap is needed for the measurement corresponding to the frequency point or the cell in the designated list and the UE does not have a capability of inter-frequency without the measurement gap, determining that the measurement gap is needed to be configured for the measurement corresponding to the frequency point or the cell in the designated list.

6. The method of claim 1, further comprising:
when the measurement corresponding to the frequency point or the cell in the designated list satisfies that the measurement gap is not needed, determining that the measurement gap is not needed to be configured for the measurement corresponding to the frequency point or the cell in the designated list.

7. A terminal device comprising a processor and a memory, wherein the memory is configured to store a computer program, and the processor is configured to invoke and run the computer program stored in the memory to:
determine, according to measurement gap configuration information, a capability without a measurement gap and a time-frequency position condition, that a measurement gap is not needed to be configured for a measurement corresponding to a frequency point or a cell in a designated list, wherein the time-frequency position condition comprises a position relationship between a neighbor cell synchronization signal block (SSB) and an UE serving cell active bandwidth part (BWP); and perform a measurement without the measurement gap, wherein the measurement gap configuration information comprises measurement gap indication information, and the measurement gap indication information indicates that there is no measurement gap, wherein the measurement comprises an inter-frequency measurement.

8. The terminal device of claim 7, wherein the capability without the measurement gap comprises that: the UE has a capability of inter-frequency without the measurement gap and/or the UE does not have the capability of inter-frequency without the measurement gap, wherein, the UE having the capability of inter-frequency without the measurement gap represents that the UE is able to not use the measurement gap when performing the inter-frequency measurement; and the UE not having the capability of inter-frequency without the measurement gap represents that the UE has to use the measurement gap when performing the inter-frequency measurement.

9. The terminal device of claim 7, wherein the processor is further configured to invoke and run the computer program stored in the memory to:
acquire the capability without the measurement gap and/or the time-frequency position condition.

10. The terminal device of claim 7, wherein the processor is further configured to invoke and run the computer program stored in the memory to:
when the measurement gap is needed for the measurement corresponding to the frequency point or the cell in the designated list and the UE has a capability of inter-frequency without the measurement gap, determine that the measurement gap is not needed to be configured for the measurement corresponding to the frequency point or the cell in the designated list in response to at least one of following conditions being satisfied:
a neighbor cell SSB being within an UE serving cell active BWP; or
a current BWP of the serving cell where the UE is located being an initial BWP.

11. The terminal device of claim 7, wherein the processor is further configured to invoke and run the computer program stored in the memory to:
when the measurement gap is needed for the measurement corresponding to the frequency point or the cell in the designated list and the UE does not have a capability of inter-frequency without the measurement gap, determine that the measurement gap is needed to be configured for the measurement corresponding to the frequency point or the cell in the designated list.

12. A network device comprising a processor and a memory, wherein the memory is configured to store a computer program, and the processor is configured to invoke and run the computer program stored in the memory to:
transmit measurement gap configuration information, wherein the measurement gap configuration information comprises measurement gap indication information, and the measurement gap indication information there is no measurement gap, wherein the measurement gap configuration information is used for UE to determine that a measurement gap is not needed to be configured for a measurement corresponding to a frequency point or a cell in a designated list according to the measurement gap configuration information, a capability without the measurement gap and a time-frequency position condition, wherein the measurement comprises an inter-frequency measurement, wherein the time-frequency position condition comprises a position relationship between a neighbor cell synchronization signal block (SSB) and an UE serving cell active bandwidth part (BWP).

13. The network device of claim 12, wherein the processor is further configured to invoke and run the computer program stored in the memory to:
  indicate that the measurement gap is not needed for the measurement corresponding to the frequency point or the cell in the designated list.

* * * * *